US010989351B2

(12) United States Patent
Goulet (10) Patent No.: US 10,989,351 B2
(45) Date of Patent: *Apr. 27, 2021

(54) BREATHABLE MULTI-COMPONENT EXHAUST INSULATION SYSTEM

(71) Applicant: SAPREX, LLC, Gastonia, NC (US)

(72) Inventor: Robert Jacque Goulet, Gastonia, NC (US)

(73) Assignee: SAPREX, LLC, Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,395

(22) Filed: Mar. 13, 2020

(65) Prior Publication Data

US 2020/0217444 A1    Jul. 9, 2020

Related U.S. Application Data

(63) Continuation of application No. 16/413,520, filed on May 15, 2019, now Pat. No. 10,591,104, which is a
(Continued)

(51) Int. Cl.
*F16L 59/02*    (2006.01)
*F01N 13/14*    (2010.01)
(Continued)

(52) U.S. Cl.
CPC .............. *F16L 59/029* (2013.01); *B32B 1/08* (2013.01); *B32B 5/08* (2013.01); *B32B 5/22* (2013.01);
(Continued)

(58) Field of Classification Search
CPC .... F01N 13/14; F01N 13/148; F01N 13/1805; F01N 13/1811; F01N 13/1816;
(Continued)

(56) References Cited

U.S. PATENT DOCUMENTS

| 3,053,715 A | 9/1962 | Labino |
| 3,092,530 A | 6/1963 | Plummer |

(Continued)

FOREIGN PATENT DOCUMENTS

| DE | 102010028433 A1 | 11/2011 |
| WO | 9732067 A1 | 9/1997 |
| WO | 2005085608 A1 | 9/2005 |

OTHER PUBLICATIONS

Office Action dated Apr. 12, 2018, by the European Patent Office for European Patent Application No. 13791680.5.
(Continued)

*Primary Examiner* — J C Jacyna
(74) *Attorney, Agent, or Firm* — Moore & Van Allen PLLC; Henry B. Ward, III (57) ABSTRACT

A breathable, multi-layer exhaust insulation system is provided. The system includes a multi-layer sleeve, wherein the first layer, which is positioned adjacent the exhaust system pipes, is a braided sleeve which may be constructed from high-temperature resistant materials such as e-glass, s-glass, silica or ceramic. Additional braided layers of material may be included, as well. An outside cover of material is preferably a circular knitted fabric that contains glass fibers and resin-based fibers. The knitted fabric forms a tube on the outside of the insulating layers, and may be formed from a core spun yarn, which includes a glass filament core and a high-melt fiber on the wrap. Optionally, the system may also include a perforated or unperforated metal foil layer and/or a tape wrap, and the various components may be configured as desired.

21 Claims, 6 Drawing Sheets

Related U.S. Application Data continuation of application No. 15/985,135, filed on May 21, 2018, now Pat. No. 10,295,109, which is a continuation of application No. 13/475,501, filed on May 18, 2012, now Pat. No. 9,976,687.

(51) Int. Cl.

| | | |
|---|---|---|
| *F01N 13/18* | (2010.01) | |
| *D04B 1/14* | (2006.01) | |
| *F16L 59/08* | (2006.01) | |
| *B32B 5/08* | (2006.01) | |
| *B32B 5/22* | (2006.01) | |
| *B32B 5/26* | (2006.01) | |
| *B32B 1/08* | (2006.01) | |

(52) U.S. Cl.
CPC .............. *B32B 5/26* (2013.01); *D04B 1/14* (2013.01); *F01N 13/148* (2013.01); *F01N 13/1816* (2013.01); *F16L 59/08* (2013.01); *B32B 2250/02* (2013.01); *B32B 2250/03* (2013.01); *B32B 2250/04* (2013.01); *B32B 2250/20* (2013.01); *B32B 2262/0261* (2013.01); *B32B 2262/0269* (2013.01); *B32B 2262/0276* (2013.01); *B32B 2262/101* (2013.01); *B32B 2262/105* (2013.01); *B32B 2262/14* (2013.01); *B32B 2307/304* (2013.01); *B32B 2307/306* (2013.01); *B32B 2597/00* (2013.01); *D10B 2505/12* (2013.01)

(58) Field of Classification Search
CPC .......... F16L 59/08; F16L 59/029; D04B 1/14; D10B 2505/12
See application file for complete search history.

(56) References Cited

U.S. PATENT DOCUMENTS

| | | | |
|---|---|---|---|
| 4,299,884 A | 11/1981 | Payen | |
| 4,428,999 A | 1/1984 | George et al. | |
| 5,092,122 A | 3/1992 | Bainbridge | |
| 5,134,846 A | 8/1992 | White | |
| 5,549,947 A | 8/1996 | Quigley | |
| 5,556,677 A | 9/1996 | Quigley | |
| 5,615,711 A | 4/1997 | Lewis | |
| 5,617,900 A | 4/1997 | Weil | |
| 5,639,552 A | 6/1997 | Fukushima | |
| 5,795,835 A | 8/1998 | Bruner et al. | |
| 5,849,379 A | 12/1998 | Gladfelter et al. | |
| 5,985,385 A | 11/1999 | Gottfried | |
| 6,045,884 A | 4/2000 | Hess et al. | |
| 6,610,928 B2 | 8/2003 | Synder | |
| 6,769,455 B2 | 8/2004 | Toas et al. | |
| 6,978,643 B2 | 12/2005 | Akers et al. | |
| 7,152,633 B2 | 12/2006 | White | |
| 8,950,168 B2 | 2/2015 | Heitmann et al. | |
| 9,388,515 B2 | 7/2016 | Goulet | |
| 9,976,687 B2* | 5/2018 | Goulet | B32B 1/08 |
| 10,295,109 B2* | 5/2019 | Goulet | B32B 1/08 |
| 10,591,104 B2* | 3/2020 | Goulet | D04B 1/14 |
| 2002/0168488 A1 | 11/2002 | Gladfelter et al. | |
| 2007/0049148 A1 | 3/2007 | Chien et al. | |
| 2007/0131299 A1 | 6/2007 | Kombleet | |
| 2007/0251595 A1 | 11/2007 | Chen | |
| 2009/0197044 A1 | 8/2009 | Pelzer et al. | |
| 2009/0277526 A1 | 11/2009 | Merry | |
| 2010/0139197 A1 | 6/2010 | Woodhall | |
| 2010/0154916 A1 | 6/2010 | Jackson et al. | |
| 2010/0154917 A1 | 6/2010 | Batallas et al. | |
| 2011/0000572 A1 | 1/2011 | Ramaswamy et al. | |
| 2012/0082807 A1 | 4/2012 | Malloy et al. | |
| 2013/0097839 A1 | 4/2013 | Latham et al. | |
| 2016/0311152 A1* | 10/2016 | Goulet | D02G 3/402 |
| 2018/0023222 A1* | 1/2018 | Zhang | D04B 7/32 66/170 |
| 2020/0217443 A1* | 7/2020 | Lubenow | F01N 13/14 |

OTHER PUBLICATIONS

Notice of Allowance dated Jul. 24, 2019, by the Canadian Intellectual Property Office for Canadian Patent Application No. 2,912,854.
Supplementary European Search Report dated Aug. 29, 2017, by the European Patent Office for related European Patent Application No. 13791680.5.
International Search Report dated Sep. 20, 2013, for related International Patent Application No. PCT/US2103/041391.
Written Opinion dated Sep. 20, 2013, for related International patent Application No. PCT/US2013/041391.
International Preliminary Report on Patentability dated Nov. 18, 2014, for related International Patent Application No. PCT/US2013/041391.
Canadian Office Action and Search Report dated Oct. 2, 2018, for relation Canadian Patent Application No. 2,912,854.
Decision to Grant dated Sep. 14, 2018, by the European Patent Office for related European Patent Application No. 13791680.5.

* cited by examiner

BREATHABLE MULTI-COMPONENT EXHAUST INSULATION SYSTEM

CROSS-REFERENCE TO PRIORITY APPLICATION

This application is a continuation of U.S. patent application Ser. No. 16/413,520 filed on May 15, 2019, now U.S. Pat. No. 10,591,104, which itself is a continuation of U.S. patent application Ser. No. 15/985,135 filed on May 21, 2018, now U.S. Pat. No. 10,295,109, which itself is a continuation of U.S. patent application Ser. No. 13/475,501 filed on May 18, 2012, now U.S. Pat. No. 9,976,687, both for a "BREATHABLE MULTI-COMPONENT EXHAUST INSULATION SYSTEM," and all of which are hereby incorporated by reference in their entirety.

BACKGROUND OF THE INVENTION

The present invention relates generally to insulation for exhaust systems and other types of pipe systems that transport hot gases and other hot fluid materials. More specifically, the present invention relates to a multi-component sleeve that may be used, among other things, to fit exhaust systems on vehicles generally and large trucks in particular.

Heretofore, various insulation systems have been used to insulate automotive and industrial exhaust systems. Exhaust insulation systems are used to maintain high temperature of exhaust gases in order to provide more efficient and complete combustion of fuels, and to protect surrounding components from the high exhaust temperatures. Additionally, maintaining high exhaust temperatures tends to increase the velocity of the exhaust gases through the system, which allows the engine cylinder to more fully evacuate and aids in the emission control processes. On large bore diesel trucks, insulating the exhaust system has been shown to improve the performance of the emission control system located in the exhaust stream system.

U.S. Pat. No. 6,610,928 discloses a sleeve for providing thermal insulation to elongated substrates, formed from a composite sheet having a tough, resilient reinforcing layer to which a metallic reflective layer is attached on one side and a fibrous, non-woven insulative layer is attached on the opposed side. The sleeve includes a seam, formed lengthwise along the sleeve in spaced relation to the reverse fold, defining a central space for receiving elongated substrates.

U.S. Pat. No. 6,978,643 is directed to a multilayer sleeve for insulating or protecting elongated substrates, wherein the sleeve is continuously knitted in different sections integrally joined end to end, the sections being formed of different filamentary members chosen for desired characteristics. The sleeves are formed into the multilayer configuration by reverse folding the sleeves inwardly to place one section coaxially within another.

U.S. Pat. No. 5,134,846 discloses a cover for insulating exhaust systems of internal combustion engines comprising a tubular shaped layer of insulating material circumscribingly engaging the exhaust system and a flexible metal sleeve for protecting the insulating material and holding the insulating material against the exhaust system. The cover is held in place by hose clamps or tie wraps.

U.S. Pat. No. 5,092,122 is directed to a means and method for insulating automotive exhaust pipes by sliding a flexible insulated tube over the exhaust pipe. The tube comprises concentrically arranged inner and outer corrugated stainless steel tubes, with the annulus between the corrugated tubes filled with refractory fiber insulation.

U.S. Pat. No. 5,617,900 includes a thermally insulative sleeve with a seamless, hollow flexibly resilient inner tubular member woven of strand material including at least one metal wire strand, a separate, integral, at least essentially unbroken, metal surface member applied over the inner tubular member extending along and at least essentially completely surrounding the inner tubular member and a flexible outer cover also woven of strand material extending along and completely around the inner tubular member and metal surfaced member securing the metal surface member with the inner tubular member and offering some degree of protection. The inner tubular member may be knit from wire or from a combination of wire and glass fiber yarn, the latter providing some thermal insulative protection.

U.S. Patent Application Publication No. 2002/0168488 discloses a protective sleeve for covering elongated substrates, wherein the sleeve is knitted from a combination of first and second filamentary fibers having different properties from one another. The filamentary members are plated so that the filamentary members with properties compatible with the substrate are positioned predominantly on the inner surface of the sleeve facing and engaging the substrate. Filament properties include heat resistance, high tensile strength, resistance to abrasion, chemical attack and damping capability. The sleeve includes ribs integrally knitted lengthwise along the sleeve to form insulating air pockets, and the ends of the sleeve are finished with welts to prevent unraveling.

Unfortunately, many of these prior art exhaust insulation sleeves suffer from various drawbacks. Some are expensive to manufacture and difficult to install on exhaust systems. Some require specialized tooling for each distinct pipe geometry. Many do not provide sufficient breathability, so that when the insulation is exposed to water and rain, the water soaks into the insulation and does not dry quickly, which leads to rust and corrosion within the exhaust system. Because these type systems are subject to large temperature fluctuations, sometimes more than a 1000° F., from start-up to upper operating temperatures and fluctuations within operating temperatures, there is a need for insulating systems to breathe to some degree. Further, particularly in colder climates and coastal climates, salt from the roads can infiltrate the insulation system and accelerate corrosion of the system. Moreover, many of the insulation sleeves and systems are made from materials that do not maintain their structural integrity over time due to wear and tear, and further degrade from the exposure to high temperatures associate with exhaust systems. Therefore, it would be desirable to provide a breathable, tough, resilient insulating system that can withstand the rigors of exposure to high temperatures, salt, water, and general wear and tear, which is inexpensive and easy to manufacture and install.

BRIEF SUMMARY OF THE INVENTION

In accordance with one aspect of the invention, a breathable, multi-layer exhaust insulation system is provided. In one aspect of the invention, the system includes a multi-layer sleeve, wherein the first layer, which is positioned adjacent the exhaust system pipes, is a braided, knit or woven sleeve which may be constructed from high-temperature resistant materials such as e-glass, s-glass, silica or ceramic. Additional braided layers of material may be included, as well. An outside cover of material may be a circular knitted fabric that contains glass fibers, reinforcing fibers and resin-based fibers. The knitted fabric forms a tube on the outside of the insulating layers, which is made by knitting the tube or knitting a fabric and cutting and sewing the tube. The knitted tube may be formed from a core spun yarn, which includes a glass filament core and a high-melt fiber on the wrap along with stainless steel reinforcing fibers. The wrap can be made from resin type fibers including Poly(p-phenylene sulfide) PPS (sold under the trade name Ryton), Polyetherimide (PEI) sold under the trade name Ultem, Polyether ether ketone (PEEK), Polysulfone (PES), Polyphthalamide (PPA), nylon, polyester, or polypropylene.

Optionally, a metal foil layer (or multiple metal foil layers) may be disposed between the braided insulation and the knit cover to improve insulation performance and reduce the rate of fluid adsorption into the insulation layers. The metal foil layer(s) may be made of aluminum, fiberglass reinforced aluminum, stainless steel, nickel, copper or tin, although any suitable metal foil may be used. Additionally, the metal foil layer(s) may be perforated or unperforated. The perforations enhance breathability of the insulating sleeve.

In one preferred embodiment of the present invention, the insulating sleeve includes a first layer of a braided silica sleeve adjacent the exhaust system pipes, then two layers of braided e-glass for insulation, and an outer layer of a PPS/glass cover treated with a fluorocarbon sewn into a tubular sleeve using a glass/stainless steel sewing thread and a safety lock stitch. Each end of the insulation is secured using a stainless steel band clamp or other suitable attachment means.

Additionally, it may be desirable to include a high-temperature film, which is disposed about an outer side of the metal foil layer, in order to protect the metal foil layer from oxidation. Suitable high-temperature films may include polyimide (commonly referred to as "PI," and commercially available under the trade name Kapton), PEI, PPS, PEEK, PPA, silicone, nylon, polyester or polypropolene.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention includes, in a first embodiment, a breathable, multi-layer exhaust insulation system, as shown in FIGS. 1-6. The exhaust insulation system includes a multi-layer sleeve 12, which can take one of several forms, and include a variety of components. The exhaust insulation system sleeve 12 is positioned about an outer side of a pipe 10, or the like.

Component Layers

The inner layer 14 or layers of the sleeve may include a braided or knit material made from high-temperature resistant materials including, but not limited to e-glass, s-glass, silica or ceramic. Braiding is the preferred textile construction of the inner layer, due to the fact that it is possible to deliver thicker profiles than knitted materials. In one preferred embodiment, the inner layer of silica is about 1/16" thick and the glass layers are 0.2 inches thick. Further, another advantage of using braided material is that stretching the braided layer along the length of the exhaust pipe upon installation tends to tighten the braided layer down around the pipe 10 or underlying layer along the straight and bent sections. Depending upon the application and specification of the desired insulating sleeve 12, a single braided layer may be used, or multiple braided layers may be used. Additionally, the inner layer 14 of the sleeve 12, which comes into contact with the underlying exhaust pipe 10, is preferably made from this braided layer, although other textile constructions may be used, as desired.

Figure 1:
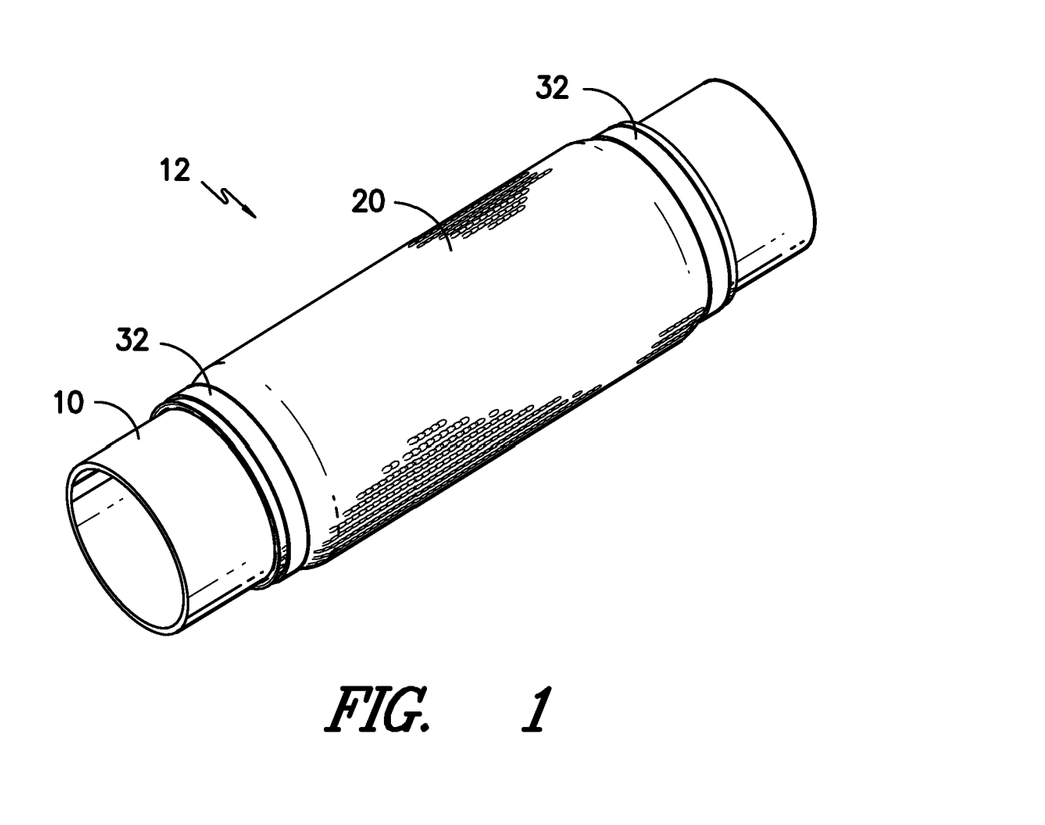
FIG. 1 is a perspective view of one embodiment of a breathable multi-component insulation system in accordance with the present invention.
Figure 2:
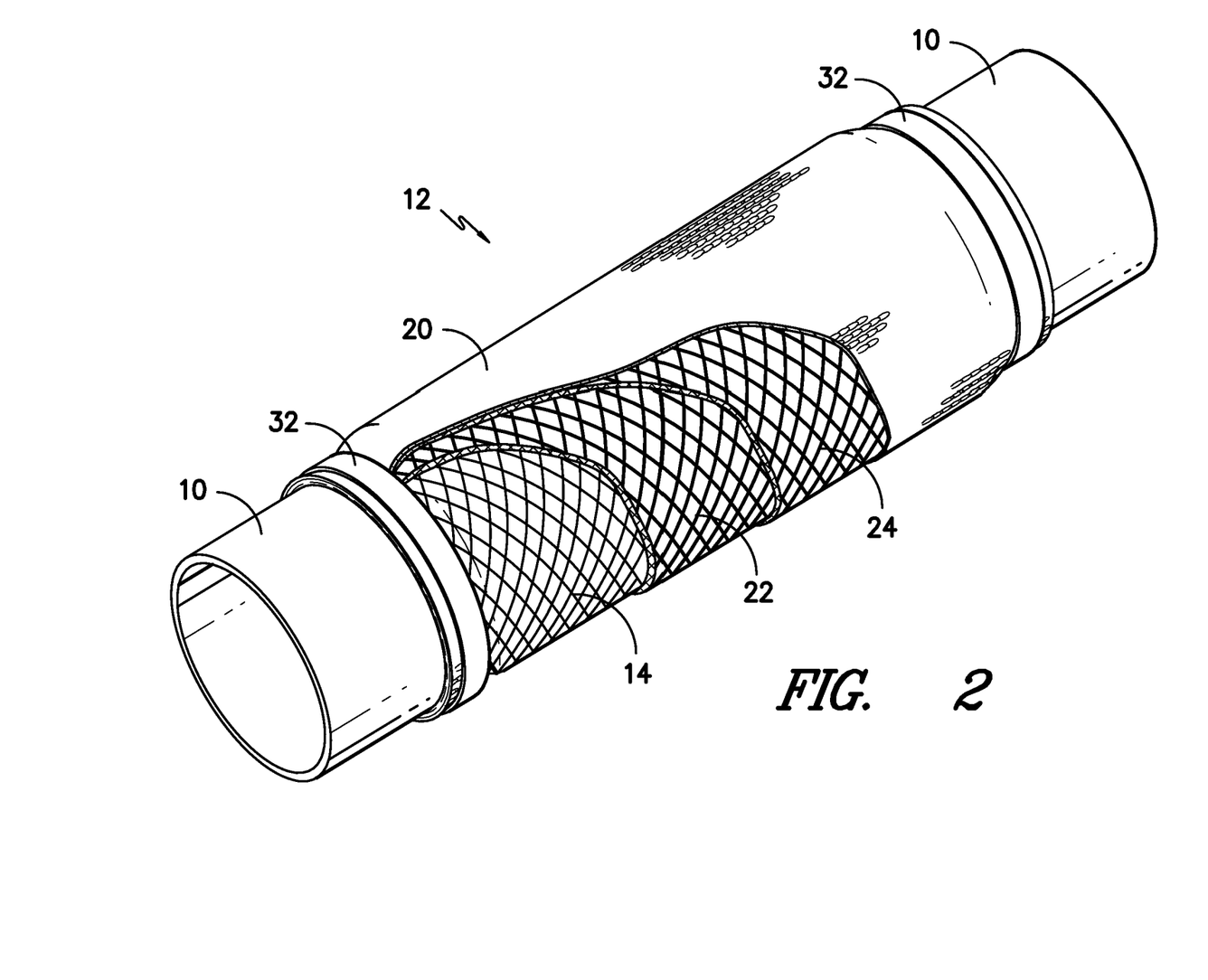
FIG. 2 is a perspective cut-away view of one embodiment of a breathable multi-component insulation system in accordance with the present invention.
Figure 3:
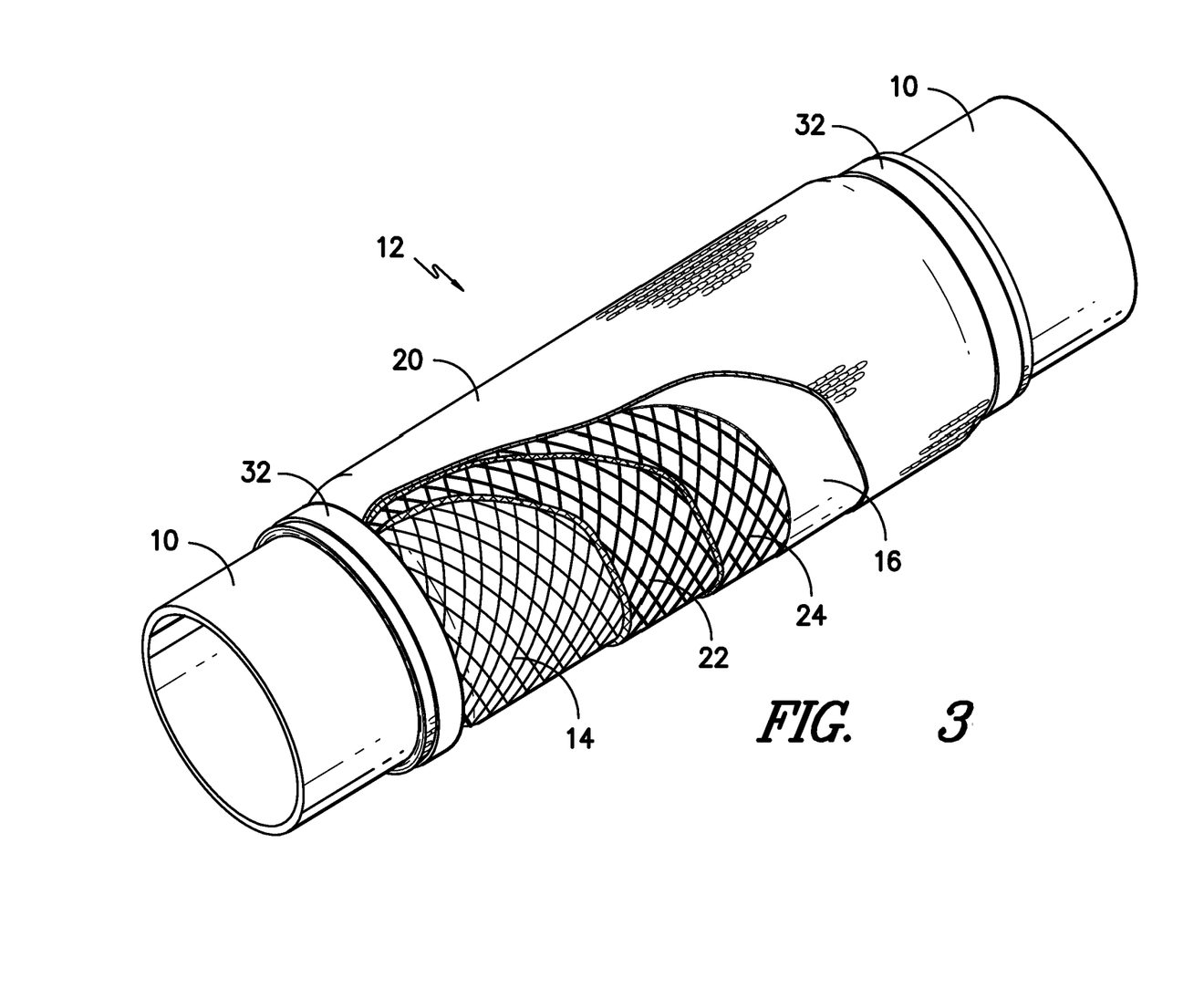
FIG. 3 is a perspective cut-away view of another embodiment of a breathable multi-component insulation system in accordance with the present invention.
Figure 4:
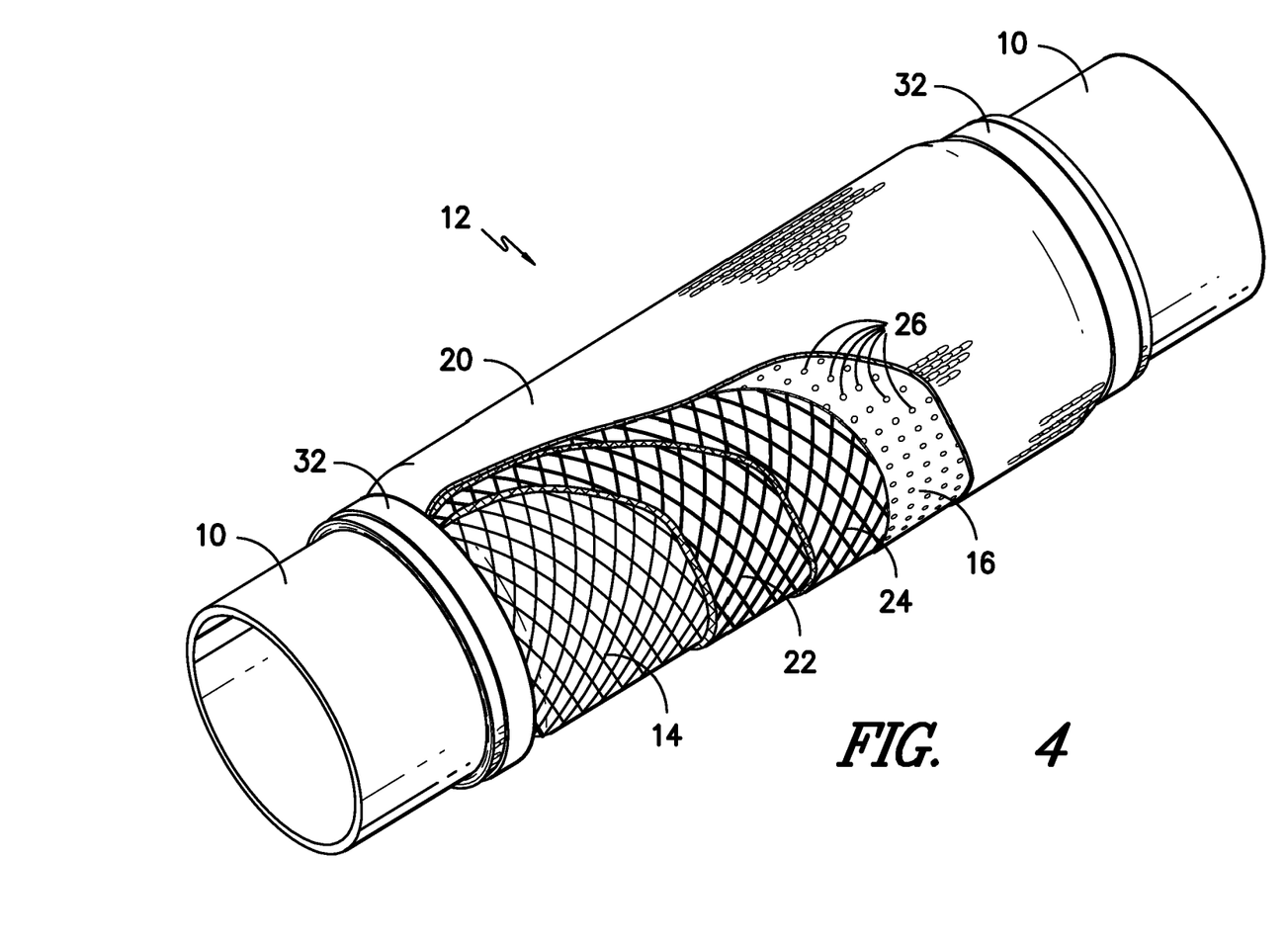
FIG. 4 is a perspective cut-away view of another embodiment of a breathable multi-component insulation system in accordance with the present invention.
Figure 5:
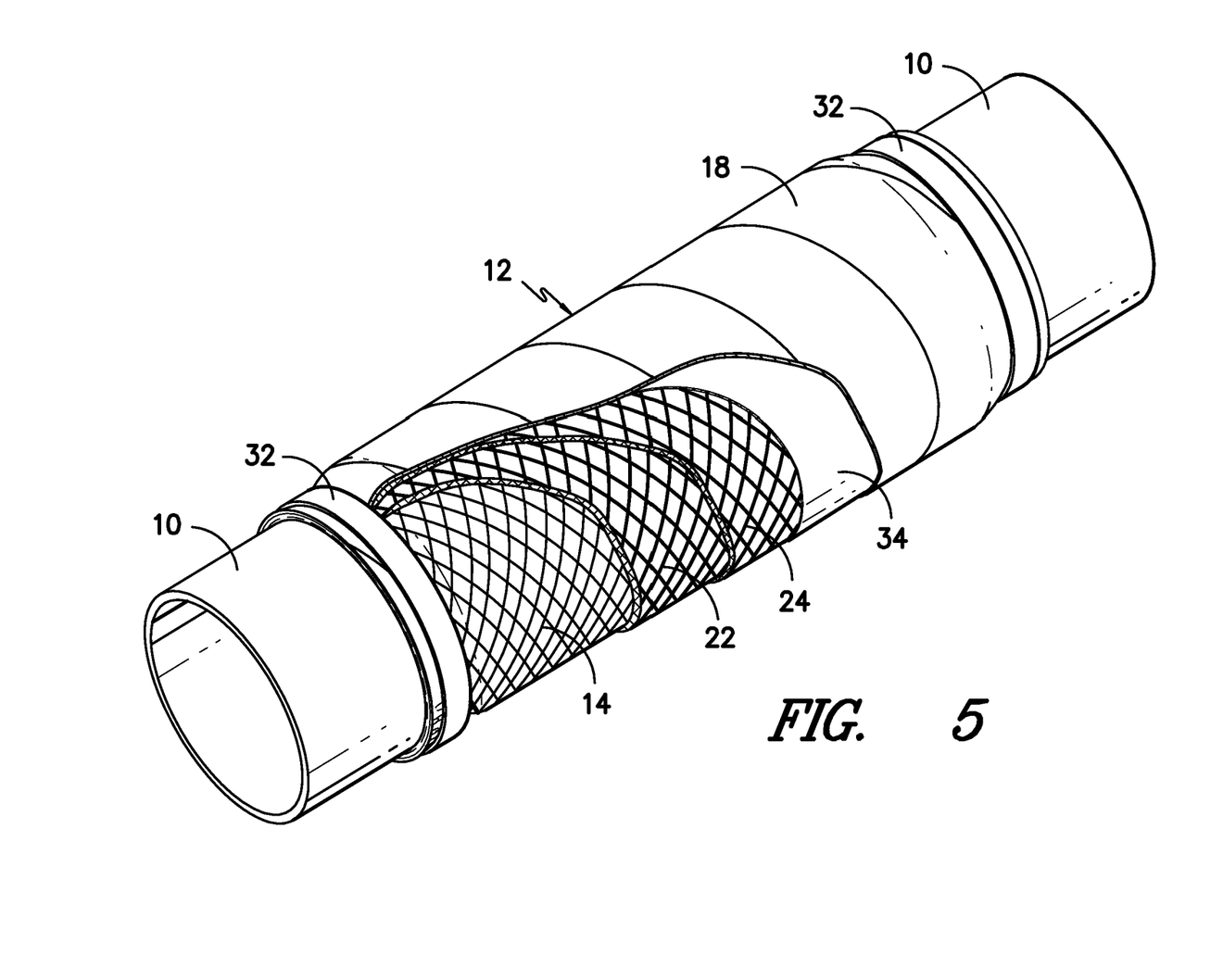
FIG. 5 is a perspective cut-away view of another embodiment of a breathable multi-component insulation system in accordance with the present invention.

Optionally, a metal foil layer 16 may be disposed on the outside of the braided layer(s), as shown in FIGS. 3 and 4. The metal foil may include perforations 26, as shown in FIG. 4, in order to enhance breathability of the sleeve 12, which facilitates drying of the sleeve 12 after exposure to water or other liquid. The metal foil layer 16 may be formed from aluminum, fiberglass reinforced aluminum, stainless steel, nickel, copper or tin, although it should be understood that any other suitable metal foil may be used, if such a layer is desired. The metal foil layer 16 serves to improve the insulation performance of the insulation sleeve 12 and to reduce the rate of fluid adsorption into the insulation layers. Additionally, it may be desirable to include a high-temperature film, which is disposed about an outer side of the metal foil layer 16, in order to protect the metal foil layer 16 from oxidation. Suitable high-temperature films may include polyimide (PI) (commercially available under the trade name Kapton), PEI, PPS, PEEK, PPA, silicone, nylon, polyester or polypropolene. Optionally, a tape wrap 18 may be wrapped around the metal foil layer 16, as shown in FIG. 5, primarily to prevent salt and other corrosive materials from penetrating through the insulative sleeve. One example of a tape wrap 18 is sold by DuPont, under the tradename of KAPTON™.

An outer cover layer 20 is preferably a knitted tube that fits around the other, underlying layers. Generally, the outer cover layer 20 comprises a knitted fabric that includes glass fibers and resin-based fibers. Thermoplastic fibers may include polyester, nylon, PPS or ULTEM™. The outer cover layer 20 knitted tube is preferably made from a core spun yarn, which includes a glass filament core and a high melt fiber wrapped around the glass filament core further twisted with a stainless steel yarn. The wrap may be made from PPS (Ryton). The outer cover layer 20 knitted tube may be disposed on the outside of the underlying insulating layers by knitting the tube around the underlying layers, or by knitting the tube and cutting and sewing the outer cover layer 20 knitted tube around the underlying layers of the sleeve. Additionally, the outer cover layer 20 may be treated with a fluorocarbon, such as Zonyl from Dupont, in order to reduce the penetration of fluids into the cover and the overall system.

Preferred Construction

In one preferred embodiment, the inner layer 14 adjacent the exhaust pipe 10 is a braided silica sleeve. The next two layers 22, 24 outside of the inner braided silica layer are each preferably formed from braided e-glass for insulation. The outer cover layer 20 is a 3-dimensional, spacer fabric in which a single fabric is comprised of three layers or portions, an inner portion, middle portion and outer portion. The outer portion preferably includes PPS/glass and stainless steel yarn. The inner portion is preferably made from glass fibers and the middle portion is made from PPS/glass/stainless steel yarns. The outer cover layer 20 may be treated with a fluorocarbon, and may be sewn into a tubular sleeve, preferably by using a glass/stainless steel sewing thread and a safety lock stitch. Stainless steel band clamps 32 are the preferred means for affixing the exhaust insulation sleeve 12 to the pipe 10, although other attachment means may be used.

Figure 6:
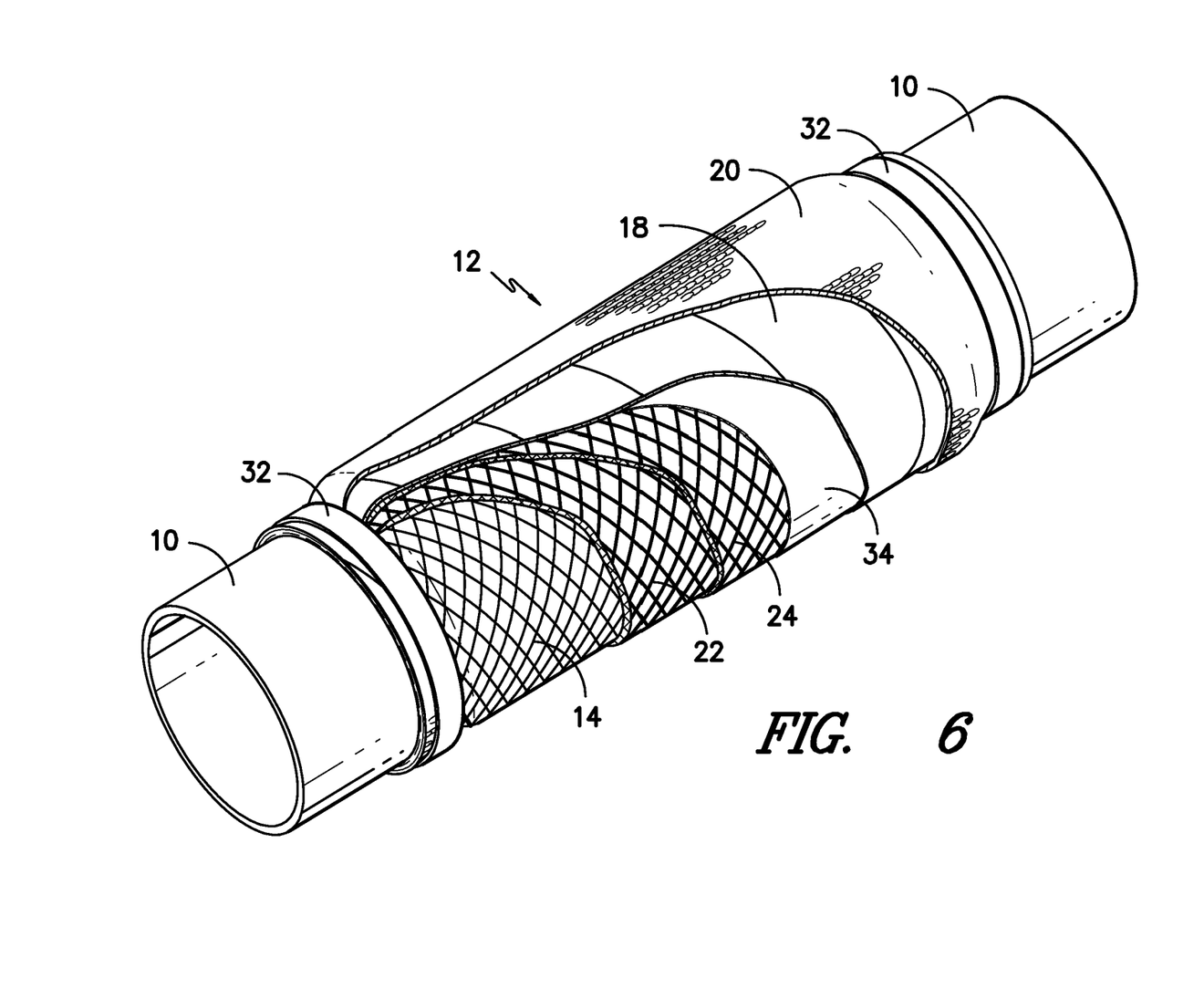
FIG. 6 is a perspective cut-away view of another embodiment of a breathable multi-component insulation system in accordance with the present invention.

Alternatively, another preferred embodiment includes a layer of fiberglass reinforced aluminum 34 disposed between the outer cover layer 20 and the underlying braided e-glass layer 24. Additionally, this layer of fiberglass reinforced aluminum may include a series of perforations throughout that layer, in order to enhance the breathability of the sleeve. One other alternative embodiment includes the use of a tape wrap 18, such as the prior-mentioned DuPont product KAPTON™, which is wrapped around the outside of the fiberglass reinforced aluminum layer set forth above, as shown in FIGS. 5 and 6.

Installation

To install the sleeve 12 on a section of exhaust pipe 10, the layers are added by sliding the inner layer 14 onto the pipe, then sliding the next layer 22 over the underlying layer 14, and continuing in this fashion until the only remaining layer to install is the outer cover layer 20. For the underlying braided layers, an installer may optionally stretch them along the length of the section of pipe 10 in order to tighten them down to the pipe 20 or underlying layers. The outer cover layer 20 may then be slipped over the underlying layers. The system can also be preassembled and then slipped onto the pipe 10 as a single component. The outer cover layer 20 may be knitted and finished as a flat fabric and then cut and sewn into the correctly sized tube. The outer layer 20 may also be knit to the correct size diameter and used in this form. Then the clamps 32 are applied to each end of the sleeve 12, in order to secure it to the pipe 10, and the entire apparatus is placed into an oven, preferably at about 560° F. for one hour, for curing. The outer layer 20 becomes dimensionally stable and significantly stiffer as a result of the yarns fusing together and more durable after curing, although the entire system remains breathable.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A breathable, multi-component exhaust insulation sleeve for an exhaust pipe, said insulation sleeve comprising:

an inner layer comprising a first high-temperature resistant material, wherein the inner layer is configured to be positioned around an outer surface of a section of the exhaust pipe; and an outer cover layer comprising heat cured polymeric resin and a fabric including yarns comprising glass fibers, wherein the outer cover layer is configured to be positioned around the inner layer, wherein the yarns of the outer cover layer are fused together by the heat cured polymeric resin, wherein the fused yarns and heat cured polymeric resin dimensionally stabilize and stiffen the outer cover layer around the inner layer.

2. The insulation sleeve set forth in claim 1, wherein said inner layer is made from material selected from the group consisting of e-glass, s-glass, silica, basalt and ceramic.

3. The insulation sleeve set forth in claim 1, wherein said outer cover layer is made from a core spun yarn having a glass filament core and a thermoplastic fiber wrapped around said glass filament core.

4. The insulation sleeve set forth in claim 3, wherein said thermoplastic fiber is selected from the group consisting of Poly(p-phenylene sulfide), Polyetherimide, Polyether ether ketone, Polysulfone, Polyphthalamide, nylon, polyester, and polypropylene.

5. The insulation sleeve set forth in claim 1, further including at least one middle layer disposed between said inner layer and said outer layer.

6. The insulation sleeve set forth in claim 5, wherein said middle layer is a metal foil layer.

7. The insulation sleeve set forth in claim 6, wherein said metal foil layer includes a series of perforations.

8. The insulation sleeve set forth in claim 6, wherein said metal foil layer is made from a material selected from the group consisting of aluminum, fiberglass reinforced aluminum, stainless steel, nickel, copper and tin.

9. The insulation sleeve set forth in claim 6, wherein said metal foil layer is over-wrapped with a high-temperature tape made from materials selected from the group consisting of fiberglass, PPS, PEI, PI, PPA, nylon, polyester and polypropylene.

10. The insulation sleeve set forth in claim 6, wherein said metal foil layer includes a film disposed on at least one side of said metal foil layer, wherein said film is manufactured from material selected from the group consisting of Poly(p-phenylene sulfide), Polyetherimide, Polyether ether ketone, Polysulfone, Polyphthalamide, nylon, polyester and polypropylene.

11. The insulation sleeve set forth in claim 1, wherein said outer cover layer is treated with a fluorocarbon.

12. The insulation sleeve set forth in claim 1, wherein said inner layer is formed from braided silica, and wherein said sleeve further comprises at least one layer of braided fabric including e-glass fibers.

13. The insulation sleeve set forth in claim 12, wherein said outer cover layer is formed from PPS/glass fibers.

14. The insulation sleeve set forth in claim 13, wherein said outer cover layer is sewn into a tubular sleeve using a high temperature sewing thread made from material selected from the group consisting of glass/stainless steel, meta aramid and para-aramid.

15. The insulation sleeve set forth in claim 14, wherein said outer cover layer is sewn into said tubular sleeve with a safety lock stitch.

16. The insulation sleeve set forth in claim 12, further including a second layer of said braided e-glass fibers, which is disposed about the outside of said at least one layer of said braided e-glass fibers.

17. The insulation sleeve set forth in claim 16, further including a metal foil layer disposed about the outer surface of said second layer of said braided e-glass fibers.

18. The insulation sleeve set forth in claim 17, wherein said metal foil layer comprises fiberglass reinforced aluminum.

19. The insulation sleeve set forth in claim 18, wherein said metal foil layer includes a series of perforations.

20. The insulation sleeve set forth in claim 17, further including a tape wrap disposed about an outer surface of said metal foil layer.

21. The insulation sleeve set forth in claim 5, wherein the at least one middle layer comprises a tape wrap.

\* \* \* \* \*